United States Patent
Silvola et al.

(10) Patent No.: US 8,185,073 B2
(45) Date of Patent: May 22, 2012

(54) NOISE/SIGNAL ESTIMATION FOR WIRELESS SYSTEMS

(75) Inventors: Pirkka Silvola, Oulu (FI); Veli-Pekka Kaasila, Oulu (FI)

(73) Assignee: Nokia Corporation, Espoo (FI)

( * ) Notice: Subject to any disclaimer, the term of this patent is extended or adjusted under 35 U.S.C. 154(b) by 741 days.

(21) Appl. No.: 12/292,613

(22) Filed: Nov. 21, 2008

(65) Prior Publication Data
US 2009/0258621 A1    Oct. 15, 2009

(30) Foreign Application Priority Data
Apr. 15, 2008    (EP) .................................... 08007403

(51) Int. Cl.
*H04B 17/00*    (2006.01)

(52) U.S. Cl. ................... 455/226.3; 455/67.11; 375/260

(58) Field of Classification Search .... 455/226.1–226.3, 455/67.11, 67.13; 375/260
See application file for complete search history.

(56) References Cited

U.S. PATENT DOCUMENTS
7,187,646 B2 *    3/2007    Schramm ...................... 370/206
* cited by examiner

*Primary Examiner* — Lincoln Donovan
*Assistant Examiner* — Shikha Goyal
(74) *Attorney, Agent, or Firm* — Squire Sanders (US) LLP

(57) ABSTRACT

A method, apparatus, and computer program product, wherein received signal components are determined for a selected group of sub-carriers based on individual noise and signal contributions of the sub-carriers. At least one of noise and a parameter relating to at least one of noise and a signal of a received signal is estimated by combining the determined received signal components depending on a sign of preamble symbols of the sub-carriers.

20 Claims, 4 Drawing Sheets

NOISE/SIGNAL ESTIMATION FOR WIRELESS SYSTEMS

FIELD

The example embodiments of present invention relates to a method, apparatus, and computer program product for a communication system.

BACKGROUND

High-data-rate communications as defined in the WiMAX IEEE 802.16-2004 standard may pave the way for true broadband, multimedia services over wireless networks. Based on orthogonal-frequency-division-multiplex (OFDM) techniques, the WiMAX physical-layer (PHY) and media-access-control (MAC) protocols are outlined in the IEEE 802.16-2004 standard.

In a WiMAX receiver, it is necessary to estimate the noise power and the received signal strength indicator (RSSI). The noise and RSSI estimators are needed in the Carrier-to-interference-plus-noise ratio (CINR) calculation. The noise estimation is necessary since the preamble symbols are boosted compared to the data symbols and, thus, the total received power estimator cannot use directly in CINR calculation.

Received-signal-strength-indication (RSSI) estimation provides a simple indication of how strong a received signal is at a receiver front end. If the received signal strength is stronger than a predefined threshold value, then the link can be considered to be good. Compared to other measurements like CINR and block error rate (BER), RSSI estimation is simple and computationally less complex, as it does not require any processing and demodulation of the received samples. However, the received signal includes noise, interference, and other channel impairments. Therefore, receiving a good signal strength does not tell much about the channel and the signal quality. Instead, it gives an indication whether a strong signal is present or not in the channel of interest. CINR estimation can be employed by estimating signal power and interference power separately and then by taking the ratio of these two. The channel parameter estimates can be used to calculate the signal power.

SUMMARY

In an embodiment, a method includes determining received signal components for a selected group of sub-carriers based on individual noise and signal contributions of said sub-carriers. The method also includes estimating at least one of noise and a parameter relating to at least one of noise and a signal of a received signal by combining determined received signal components depending on a sign of preamble symbols of said used sub-carriers.

Furthermore, an apparatus comprises determination means for determining individual signal or noise contributions of sub-carriers used in a received signal. The apparatus also includes estimation means for estimating at least one of noise and a parameter relating to at least one of noise and signal of said received signal by combining said individual contributions depending on a sign of preamble symbols of said used sub-carriers.

Accordingly, in an embodiment, noise and/or parameter estimation is possible without needing any channel estimator or signal estimators (e.g. RSSI) to work properly. Furthermore, it is realistic to assume that some of the channel coefficients are at least similar for the selected group of sub-carriers, so that the noise power estimator gives a good estimates of the noise power. Similarly, signal estimation can be achieved without any channel or noise power estimator.

A received signal component of a sub-carrier may be determined by multiplying a signal contribution of the sub-carrier by a channel coefficient of the sub-carrier and adding a noise contribution of the sub-carrier.

The selected group may consist of sub-carriers having at least similar channel coefficients in the frequency domain.

Furthermore, the parameter may correspond to a received noise strength, and the estimation may comprise determining a quadratic mean of the combined received signal components for every used sub-carrier.

Additionally or alternatively, the parameter may correspond to a received signal strength indicator (such as an RSSI parameter), and the estimation comprises multiplying the combined received signal components for every used sub-carrier.

Implementation of the proposed estimation may be based on a computer program comprising code producing the above method operations when run on a computer device. The computer program may be stored on a computer-readable medium or may be downloadable from a private or public network.

Further advantageous modifications are defined in the dependent claims.

BRIEF DESCRIPTION OF THE DRAWINGS

In the following, the embodiments will be described in greater detail with reference to the accompanying drawings, in which.

DESCRIPTION OF THE EMBODIMENT

An embodiment will now be described based on an estimation of RSSI or noise power in a wireless network environment. The proposed estimation procedure or estimator can be applied in any receiver or transceiver arrangement or module provided in a terminal device or network device. It is applicable to both uplink and downlink transmissions.

Figure 1:
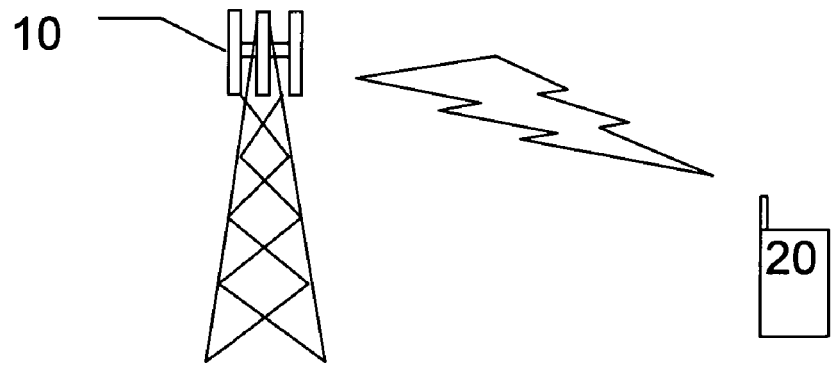
FIG. 1 shows a schematic block diagram of a communication system in which the embodiments can be implemented.

FIG. 1 depicts a communication system 100 that implements wireless communications in accordance with the Institute of Electrical and Electronics Engineers (IEEE) 802.16 broadband wireless access standards (such as WiMax) e.g. for metropolitan area networks (MANs). WiMax specifies the use of orthogonal frequency division multiplexing (OFDM) as a modulation scheme to communicate data between a signal source, such as a base station 10, and a subscriber station, such as a mobile station 20. OFDM enables communication of a large amount of data over a limited bandwidth by allocating the data among multiple smaller sub-signals, and then simultaneously transmitting the sub-signals using different sub-carriers.

Figure 2:
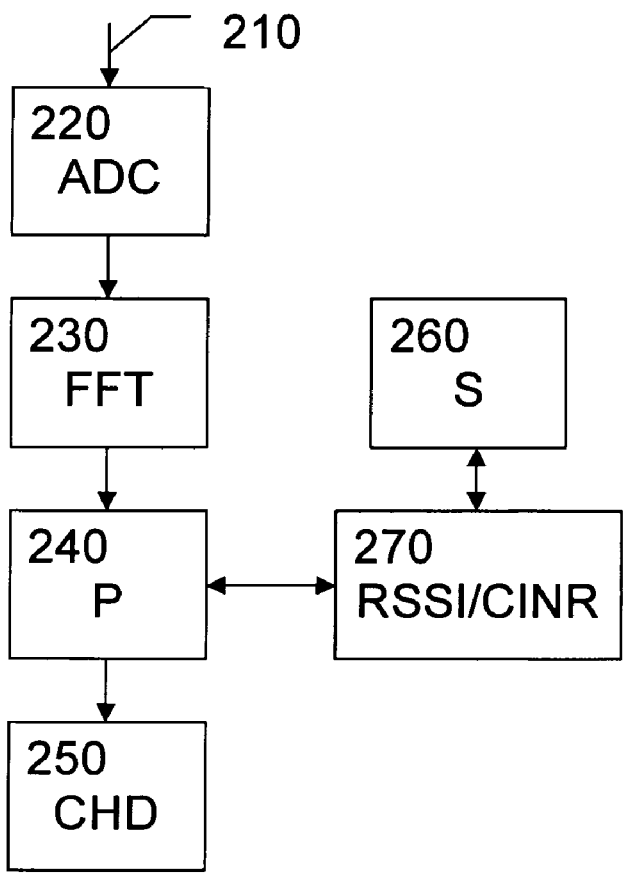
FIG. 2 shows an example schematic block diagram of signal processing components.

FIG. 2 depicts an example signal processing components. The signal processing components may be provided in a radio frequency (RF) receiver that receives communication signals. Such components can be, for example, integrated as a chip or chip set into a transceiver of a base station or a subscriber station.

The exemplary signal processing components or blocks shown in FIG. 2 comprise an analog-to-digital converter (ADC) 220, an fast fourier transformation (FFT) module 230, a processor (P) 240 (e.g. central processing unit (CPU), digital or analog signal processor or the like), and a channel decoder (CHD) 250. In operation, the ADC 220 can receive a communication signal 210, for instance an OFDM signal that was transmitted in accordance with the IEEE 802.16 broadband wireless access standards (WiMax). The ADC 220 can convert the received communication signal into a digital signal and forward the digital signal to the FFT module 230. The FFT module 230 can perform a FFT on the digital signal and output complex signal values to the processor 240. An RSSI/CINR function, functionality or unit 270 is provided at the processor 240 and can be implemented as an application executed by the processor 240 and retrieved from a data store (not shown) to generate estimates for CINR and RSSI of the communication signal 210. As an alternative, the RSSI/CINR unit 270 may be a separate hardware unit.

The processor 240 can forward the CINR and RSSI estimates to a scheduler 260 for use in selecting at least one operating parameter for the communication system. For example, in a WiMax communication system, CINR and RSSI estimates determined in accordance with the processes describe herein can be used by a base station and/or a subscriber station for modulation code scheme selection and tone/sub-channel assignment. Still, the CINR and RSSI estimates may be used to select other operating parameters and the inventive concept is not limited in this regard.

Figure 3:
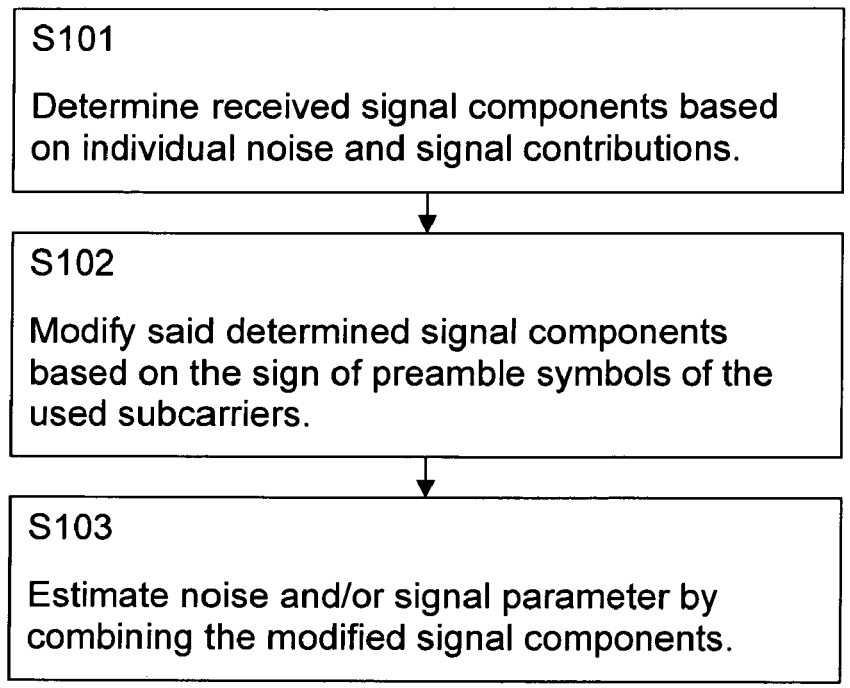
FIG. 3 shows a flow diagram of an estimation procedure according to an embodiment.

FIG. 3 shows a flow diagram estimation procedure according to an embodiment, which could be executed at the processor 240 e.g. based on the suitable software program or routine.

In a first operation S101, received signal components of the above communication signal 210 (e.g. an OFDM signal) are determined (e.g. calculated or estimated) based on individual noise and signal contributions of selected sub-carriers used in the communication signal 210. Then, the determined signal components are modified based on the sign of respective preamble symbols of the used sub-carriers. In operation S103, a desired parameter (e.g. noise and/or signal) is estimated by combining the modified contributions.

In the following, the above procedure is explained in more detail based on noise power and RSSI estimation examples.

In the example, it is assumed that the k-th and (k−3)-th channel coefficients are identical. This may be caused by the fact that a preamble of the communication signal 210 consists of three segments in a WiMAX system, e.g., the first segment consists of every third one of the used sub-carriers and so on.

In one example, it is further assumed that one transmitting device or apparatus (e.g. base station or access device) can only use one of the three segments at a time, while a segment can be used by several base stations at a time. Thus, the frequency domain received signal components of the preamble from kth and (k+3)th used sub-carriers can be expressed as:

$$r(k)=h_1(k)s_1(k)+n(k)$$

$$r(k+3)=h_1(k+3)s_1(k+3)+n(k+3), k=1,\ldots,N_{used}-3 \quad (1)$$

Where $h_1(k)$ denotes a channel coefficient of the kth sub-carrier. Subscript one indicates the index of the transmitting device using the current segment, i.e., in that case there is only one transmitting device using the current segment. Furthermore it is assumed that $h_1(k)=h_1(k+3)$ and that the term $s_1(k)=\pm A$ is a real-valued preamble symbol or signal contribution of the kth sub-carrier known in the receiver, and n(k) is the noise term or noise contribution of the kth sub-carrier.

The noise power can be estimated in the following way depending on the sign of the preamble symbols:

| $s_1(k)$ | $s_1(k+3)$ | $\hat{n}(k)$ |
|---|---|---|
| + | + | $\|r(k+3) - r(k)\|^2$ |
| − | − | $\|r(k+3) - r(k)\|^2$ |
| + | − | $\|r(k+3) + r(k)\|^2$ |
| − | + | $\|r(k+3) + r(k)\|^2$ |

Thus, the sign of the preamble symbols determines how the received signal components of the concerned sub-carrier are to be combined.

Since each combination of the preamble symbols $s_1(k)$ and $s_1(k+3)$ can be exploited, the noise power can be estimated from each used sub-carrier. In that case, the equation for the noise power estimator can be described in the compact form as $$\hat{n}(k) = \text{sign}(s_1(k+3))r(k+3) - \text{sign}(s_1(k))r(k) \quad (2)$$

$$\hat{n} = \frac{1}{2N_{used}} \sum_{k=1}^{N_{used}} |\hat{n}(k)|^2.$$

In another example, it is assumed that there are two transmitting devices or apparatuses (e.g. base stations or access devices) using one of the three segments in the preamble symbol. The two consecutive received signals from a particular segment can be described as:

$$r(k)=h_1(k)s_1(k)+h_2(k)s_2(k)+n(k)$$

$$r(k+3)=h_1(k+3)s_1(k+3)+h_2(k+3)s_2(k+3)+n(k+3),$$
$$k=1,\ldots,N_{used}-3 \quad (3)$$

where $h_i(k)$ is the channel coefficient of the ith transmitting device, and $s_i(k)$ is the preamble symbol of the ith transmitting device from the kth sub-carrier. The noise power can be estimated if the signs of the preamble symbols fulfil the following rules:

| $s_1(k)$ | $s_1(k+3)$ | $s_2(k)$ | $s_2(k+3)$ | $\hat{n}(k)$ |
|---|---|---|---|---|
| + | + | + | + | $\|r(k+3) - r(k)\|^2$ |
| − | − | − | − | $\|r(k+3) - r(k)\|^2$ |
| + | − | + | − | $\|r(k+3) + r(k)\|^2$ |
| − | + | − | + | $\|r(k+3) + r(k)\|^2$ |
| + | + | − | − | $\|r(k+3) - r(k)\|^2$ |
| − | − | + | + | $\|r(k+3) - r(k)\|^2$ |
| + | − | − | + | $\|r(k+3) + r(k)\|^2$ |
| − | + | + | − | $\|r(k+3) + r(k)\|^2$ |

In that case, 50% of the used sub-carriers can be used in the noise power estimation. Basically, the same procedure can be used also when there are more than two transmitting devices using the same segment.

In another example, the same idea as in the noise power estimation can be also used in an RSSI estimation procedure. It is first assumed that only one transmitting device is using one of the three segments. The two consecutive received signals from a particular segment can be described as $$r(k)=h_1(k)s_1(k)+n(k)$$

$$r(k+3)=h_1(k+3)s_1(k+3)+n(k+3), k=1,\ldots,N_{used}-3 \quad (4)$$

where it is again assumed that $h_1(k)=h_1(k+3)$.

Now, the modified received signals are $$\tilde{r}(k)=\text{sign}(s_1(k))r(k)/A=h_1(k)+\tilde{n}(k)$$

$$\tilde{r}(k+3)=\text{sign}(s_1(k+3))r(k+3)/A=h_1(k+3)+\tilde{n}(k+3) \quad (5)$$

and then the estimate of the RSSI can be calculated as follows:

$$\tilde{r}(k)*\tilde{r}(k+3)=h_1(k)*h_1(k+3)+h_1(k)*\tilde{n}(k+3)+\tilde{n}(k)*h_1(k+3)+\tilde{n}(k)*\tilde{n}(k+3) \quad (6)$$

It is noted that the term $h_1(k)*h_1(k+3)$ denotes the RSSI estimate of the transmitting device with index "1", while the expectation values of the rest terms are zero. The same procedure is also valid when more than one transmitting device are using the same segment in the preamble.

For example, it is now assumed that two transmitting devices are using the same segment, i.e, the received signals are:

$$r(k)=h_1(k)s_1(k)+h_2(k)s_2(k)+n(k)$$

$$r(k+3)=h_1(k+3)s_1(k+3)+h_2(k+3)s_2(k+3)+n(k+3) \quad (7)$$

And the modified received signals can be expressed as:

$$\tilde{r}(k)=\text{sign}(s_1(k))r(k)/A=h_1(k)+\tilde{s}_2(k)h_2(k)+\tilde{n}(k)$$

$$\tilde{r}(k+3)=\text{sign}(s_2(k+3))r(k+3)/A=h_1(k+3)+\tilde{s}_2(k+3)h_2(k+3)+\tilde{n}(k+3) \quad (8)$$

and then the RSSI estimator of the first transmitting device (index "1") becomes:

$$Re\{\tilde{r}(k)*\tilde{r}(k+3)\}=Re\{h_1(k)*h_1(k+3)+h_1(k)*\tilde{s}_2(k+3)h_2(k+3)+h_1(k)*\tilde{n}(k+3)+\tilde{s}_2(k)h_2(k)*h_1(k+3)+\tilde{s}_2(k)\tilde{s}_2(k+3)h_2(k)*h_2(k+3)+\tilde{s}_2(k)h_2(k)*\tilde{n}(k+3)+\tilde{n}(k)*h_1(k+3)+\tilde{n}(k)*\tilde{s}_2(k+3)h_2(k+3)+\tilde{n}(k)*\tilde{n}(k+3)\}\approx h_1(k)*h_1(k+3)\approx |h_1(k)|^2 \quad (9)$$

It is noted that the expectation value of all other terms is again zero. Even $E[\tilde{s}_2(k)\tilde{s}_2(k+3)h_2(k)*h_2(k+3)]=0$, since the term $\tilde{s}_2(k)\tilde{s}_2(k+3)$ becomes one or minus one.

Again, this RSSI estimation procedure is also valid when there are more than two transmitting devices using the same segment.

Figure 4:
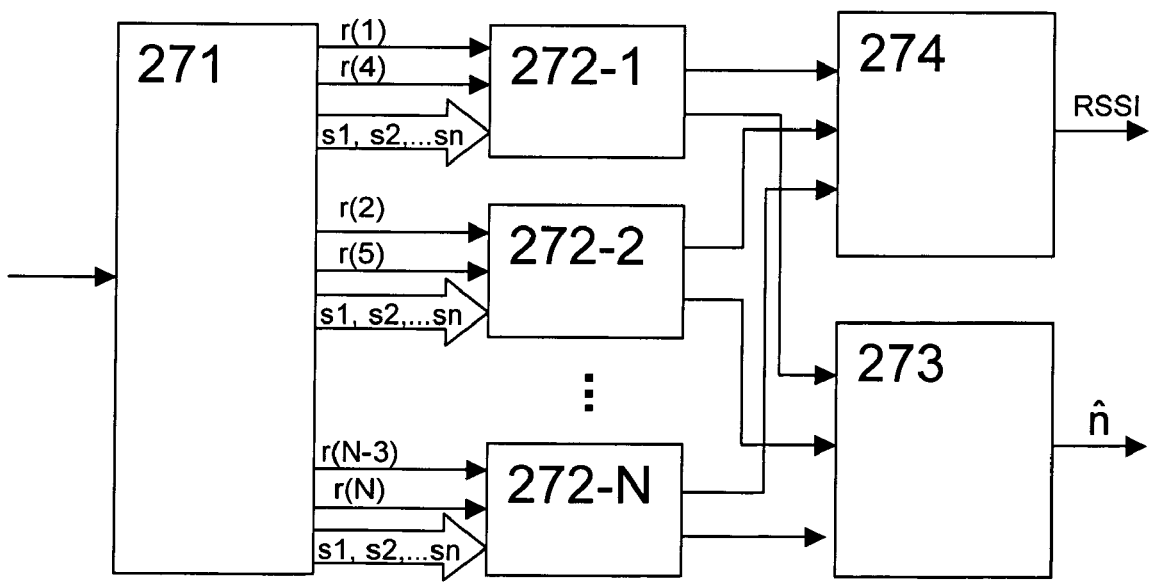
FIG. 4 shows a schematic block diagram of an estimator according to an embodiment.

FIG. 4 shows a schematic block diagram of an estimator according to an embodiment. The estimator may be provided for example in block 270 of FIG. 2 and can be implemented as a discrete hardware circuit or an integrated circuit (chip) or chip device, or can be provided in a receiver or transceiver module.

In a determination unit 271 (which may be a processor or a logic circuit), the received communication signal (e.g. communication signal 210 of FIG. 2) is separated into its sub-carriers, so as to determine the individual noise and signal components (e.g. preamble symbols or signal contributions $s_i(k)$ and noise contributions $n(k)$) of each sub-carrier. Additionally, received signal components r(k) and r(k+3) are determined or calculated based on the above mentioned noise and signal contributions of each used sub-carrier and in line with equations (1), (3), (4) and (7). Additionally, sign values $s_i$ to $s_n$ are obtained from the respective preamble symbols $s_i(k)$ of individual sub-carriers.

The above signal components r(k), r(k+3) and sign values $s_1$ to $s_n$ are supplied to a respective first combination stages 272-1 to 272-N provided for each group of sub-carriers (e.g. k and k+3) of at least similar channel parameters. Here, the signal components are combined or at least modified under consideration of or in dependence on the sign values $s_1$ to $s_n$, to thereby obtain modified signal components used for estimation the noise or signal strength parameters. This combination or modification may be performed in line with equations (2), (5) or (8).

The modified signal components for noise estimation are supplied to a noise estimator 273 which may be a processing stage and which estimates the noise parameter by combining the modified signal components of the different sub-carrier groups e.g. in line with equation (2).

As an additional or alternative option, a signal estimator 274 may be provided which receives the modified signal components of at least one of the different sub-carrier groups and estimates the RSSI parameter e.g. in line with equations (5), (8), or (9). It is noted that the noise and signal estimators 273, 274 may be provided alone or in combination to estimate at least one of the desired parameters.

Figure 5:
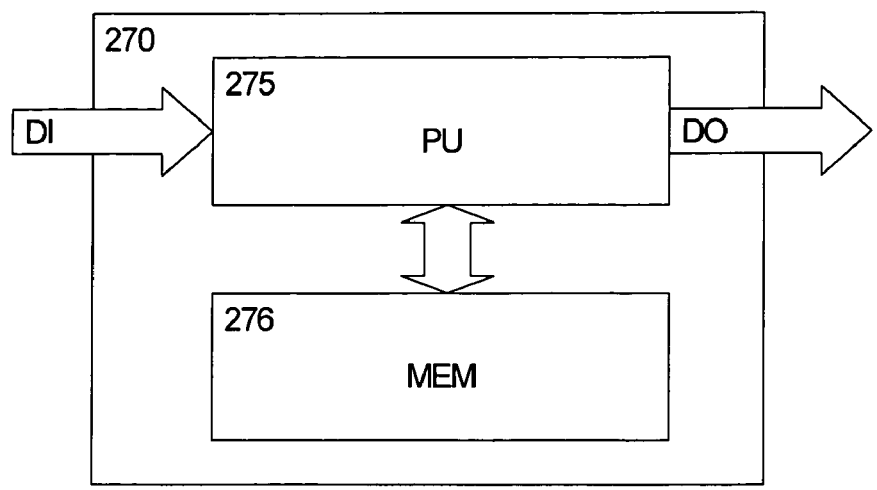
FIG. 5 shows a schematic block diagram of a software-based implementation according to an embodiment.

FIG. 5 shows a schematic block diagram of an alternative software-based embodiment of the proposed functionalities for achieving signal strength and noise estimation. The required functionalities can be implemented for example in the RSSI/CINR unit 270 or any similar estimation stage of a receiver or transceiver. This embodiment comprises a processing unit 275, which may be any processor or computer device with a control unit which performs control based on software routines of a control program stored in a memory 276. Program code instructions are fetched from the memory 276 and are loaded to the control unit of the processing unit 275 in order to perform the processing operations of the above functionalities described in connection with the block diagram of FIG. 3 or the functionality of FIG. 4. These processing operations may be performed on the basis of input data DI and may generate output data DO, wherein the input data DI may correspond to the received communication signal 210 with a plurality of sub-carriers, and the output data DO may correspond to the estimated noise parameter (e.g. CINR) or signal strength parameter (e.g. RSSI).

When there is more than one transmitting device (e.g. base station or access device) using the same segment, there are limitations dealing with preamble symbols, and thus, only part of the sub-carriers can be used. Furthermore, a small bias remains in the noise estimator, since it has been assumed that $h_i(k)=h_i(k+3)$, but in the real situations $h_i(k)\approx h_i(k+3)$. However, this can be compensated by estimating the coherence bandwidth of the channel.

Figure 6:
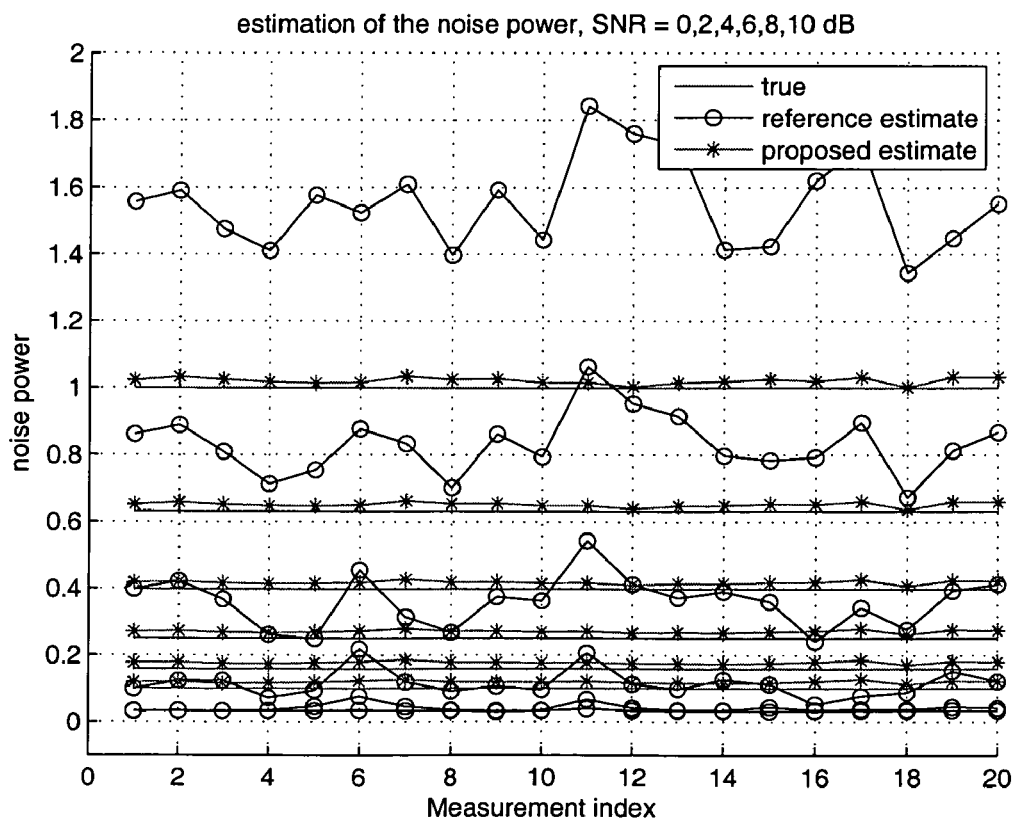
FIG. 6 shows a diagram indicating noise power estimation results as a function of measurement indexes.

FIG. 6 shows a diagram depicting the estimation of the noise power as a function of the measurement indexes, when SNR is 0, 2, 4, 6, 8, and 10 dB. One measurement is achieved by averaging sixty preamble symbols. Also the corresponding true noise power values are included FIG. 6. The used channel model is vehicle with mobile speed of 3 km/h. The used reference method (noise and RSSI estimation) needs channel estimates from each transmitting base station. The preamble indexes of the neighbour transmitting devices are obtained from a serving base station. The RSSI estimate of each base station can be calculated in the conventional reference method as:

$$RSSI_b = \frac{1}{N_{used}} \sum_{k=0}^{N_{used}-1} r(k)*h_b(k)s_b(k) \quad (10)$$

where b is the base station index and k is the sub-carrier index. The total received power can be estimated as $$R_{tot} = \frac{1}{N_{used}} \sum_{k=0}^{N_{used}-1} r(k) * r(k) \quad (11)$$

And the noise estimate can be achieved by subtracting the necessary RSSI values from the total received power.

As can be gathered from FIG. 6, the proposed noise estimation is very reliable and stays close to the true noise value.

Figure 7:
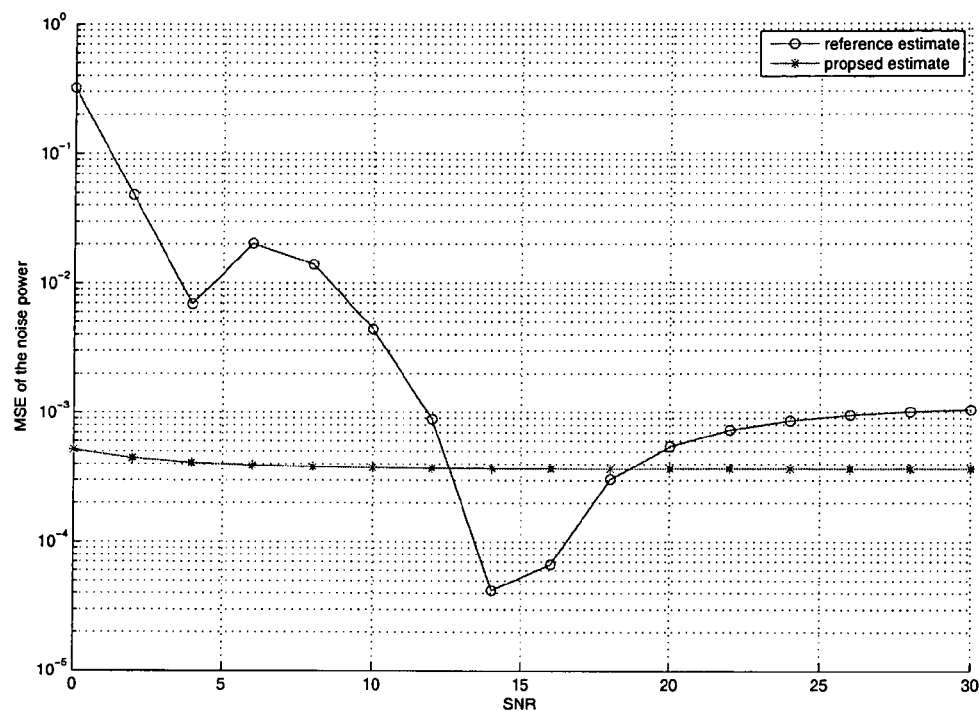
FIG. 7 shows a diagram indicating noise power estimation results as a function of as signal-to-noise ratio (SNR)

FIG. 7 shows a diagram depicting the mean squared error (MSE) of the proposed noise power estimation as a function of SNR. Although the MSE of the reference estimate is partly below the proposed estimate, the overall result over the whole SNR range is mostly better than the reference estimate and much less dependent on the SNR.

Figure 8:
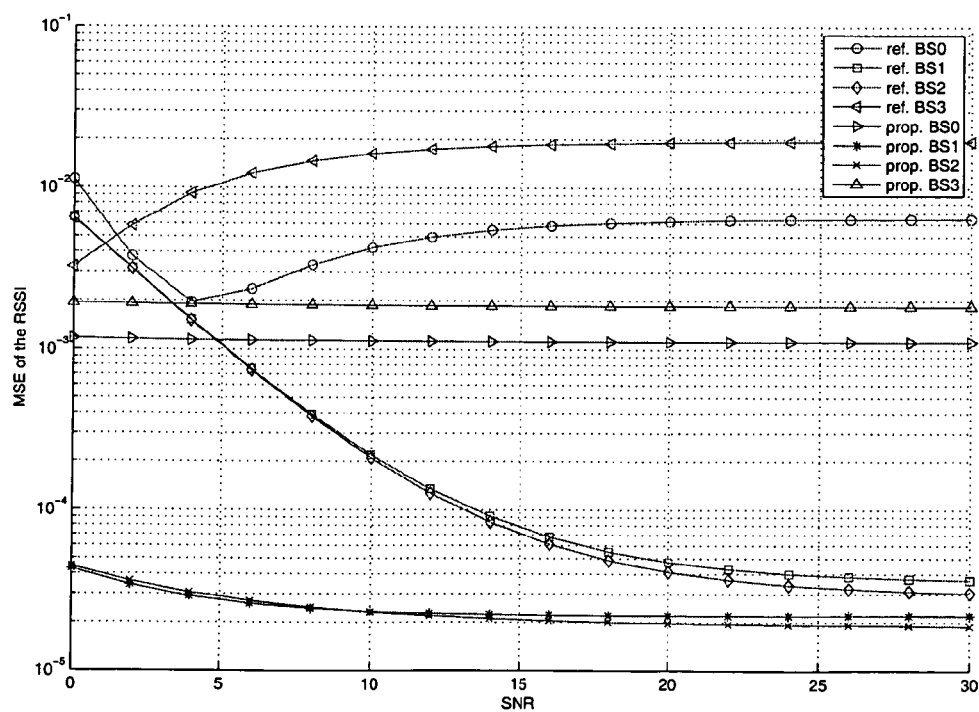
FIG. 8 shows a diagram indicating a signal strength estimation error as a function of SNR.

FIG. 8 shows a diagram depicting MSE of the RSSI values as a function of SNR. It is assumed that base stations BS0 and BS4 are using the segment #0, BS1 is using segment #1 and BS2 is using segment #2 of the signal preamble. Furthermore, the average power of the BS0 is −60 dBm and the average power of the BS1, BS2 and BS3 is −62 dBm. All results of the proposed estimation are below the results of the reference estimation for the same base station.

Like any other receiver functionality, the above embodiments can be implemented in hardware by a discrete analog or digital circuit, signal processor, or a chip or chip set (e.g. an ASIC (Application Specific Integrated Circuit)), or in software either in an ASIP (Application Specific Integrated Processor), a DSP (Digital Signal Processor), or any other processor or computer device.

In summary, a method, apparatus, and computer program product have been described, wherein received signal components are determined for a selected group of sub-carriers based on individual noise and signal contributions of the sub-carriers. at least one of noise and a parameter relating to at least one of noise and signal of a received signal is estimated by combining the determined received signal components depending on the sign of preamble symbols of the sub-carriers.

It is noted that the embodiments can be implemented or used in any transmission system where a channel estimation is performed. More specifically, the embodiments can be applied in radio systems like e.g. WiMax as currently standardized in 3GPP for WCDMA (Wideband Code Division Multiple Access), as well as 3GPP E-UTRAN (Enhanced Universal Mobile Telecommunications System (UMTS) Terrestrial Radio Access Network), such as LTE (Long Term Evolution) or 3.9G. These radio access technologies (e.g. WLAN, WiMAX, E-UTRAN or 3G LTE) may involve multiple-input multiple-output (MIMO) systems or multi-beam/multi-antenna transmitter or receiver devices (e.g. base station devices, access points or other access devices) capable of receiving signals via different receiving paths and/or channels. The proposed estimator may be implemented in a receiver apparatus, a receiver module, a chip set of a receiver, or as a part of a channel estimator sub-system. The estimates obtained in the above embodiments can be used as descriptors of a (radio) link-quality and could be transmitted (in some form) back to the radio-resource scheduler.

The embodiments described herein provide a method and apparatus for estimating noise and/or signal and/or noise parameters (e.g. CINR and RSSI) for a WiMax uplink channel based on a partial usage sub-channel (PUSC) tile structure. Nonetheless, the arrangements can be implemented with other data population structures, such as those structures that may be used for signal uplink or downlink.

The embodiments can be realized in hardware, software, or a combination of hardware and software. They can be realized in a centralized fashion in one processing system or in a distributed fashion where different elements are spread across several interconnected processing systems. Any kind of processing system or other apparatus adapted for carrying out the methods described herein is suited. A typical combination of hardware and software can be a processing system with an application that, when being loaded and executed, controls the processing system such that it carries out the methods described herein. The embodiments also can be embedded in an application product, which comprises all the features enabling the implementation of the methods described herein, and which when loaded in a processing system is able to carry out these methods.

The terms "computer program," "software," "application," variants and/or combinations thereof, in the present context, mean any expression, in any language, code or notation, of a set of instructions intended to cause a system having an information processing capability to perform a particular function either directly or after either or both of the following: a) conversion to another language, code or notation; b) reproduction in a different material form. For example, an application can include, but is not limited to, a subroutine, a function, a procedure, an object method, an object implementation, an executable application, an applet, a servlet, a source code, an object code, a shared library/dynamic load library and/or other sequence of instructions designed for execution on a processing system. In addition, the computer program, software and/or applications may be embodied on a computer readable medium, which may be accessed to retrieve the related data, which in turn may be executed in a corresponding execution operation. The computer readable medium may include, for example, a memory, such as, a hard disk, RAM, ROM, or optical storage device, etc. Furthermore, the memory may be embodied on a computer-related device, such as, a laptop, PDA, PC computer, Server, etc.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The inventive concepts can be embodied in other forms without departing from the spirit or essential attributes thereof. Accordingly, the above predetermined embodiments may vary within the scope of the attached claims.

The invention claimed is:

1. A method comprising:
   determining received signal components for a selected group of sub-carriers based on individual noise and signal contributions of said sub-carriers; and
   estimating at least one of noise and a parameter relating to at least one of noise and a signal of a received signal by combining said determined received signal components depending on a sign of preamble symbols of said sub-carriers.

2. The method according to claim 1, further comprising:
   determining a received signal component of a sub-carrier by multiplying a signal contribution of said sub-carrier by a channel coefficient of said sub-carrier and adding a noise contribution of said sub-carrier.

3. The method according to claim 1, wherein said selected group of sub-carriers comprises sub-carriers having at least similar channel coefficients in a frequency domain.

4. The method according to claim 1, wherein said parameter corresponds to a received noise strength, and said estimation comprises determining a quadratic mean of the combined received signal components for every sub-carrier.

5. The method according to claim 1, wherein said parameter corresponds to a received signal strength indicator, and said estimation comprises multiplying the combined received signal components.

6. An apparatus, comprising:
a processor, and
a memory including computer program code, the memory and the computer program code configured to, with the processor, cause the apparatus at least to
determine received signal components for a selected group of sub-carriers based on individual noise and signal contributions of said sub-carriers, and
estimate at least one of noise and a parameter relating to at least one of noise and a signal of a received signal by combining said determined received signal components depending on a sign of preamble symbols of said sub-carriers.

7. The apparatus according to claim 6, wherein the memory and the computer program code are further configured to, with the processor, cause the apparatus at least to determine a received signal component of a sub-carrier by multiplying a signal contribution of said sub-carrier by a channel coefficient of said sub-carrier and adding a noise contribution of said sub-carrier.

8. The apparatus according to claim 6, wherein said selected group comprises sub-carriers having at least similar channel coefficients in a frequency domain.

9. The apparatus according to claim 6, wherein said parameter corresponds to a received noise strength, and wherein the memory and the computer program code are further configured to, with the processor, cause the apparatus at least to determine a quadratic mean of the combined received signal components for every sub-carrier.

10. The apparatus according to claim 6, wherein said parameter corresponds to a received signal strength indicator, and wherein the memory and the computer program code are further configured to, with the processor, cause the apparatus at least to multiply the combined received signal components.

11. The apparatus according to claim 6, wherein a terminal device receives said received signal.

12. The apparatus according to claim 6, wherein the apparatus comprises a receiver module.

13. The apparatus according to claim 6, wherein the apparatus comprises a chip device.

14. A computer program embodied on a computer readable medium, said computer program configured to control a processor to perform:
determining received signal components for a selected group of sub-carriers based on individual noise and signal contributions of said sub-carriers; and
estimating at least one of noise and a parameter relating to at least one of noise and a signal of a received signal by combining said determined received signal components depending on the a sign of preamble symbols of said used sub-carriers.

15. The computer program according to claim 14, wherein the computer program is further configured to control a processor to perform:
determining a received signal component of a sub-carrier by multiplying a signal contribution of said sub-carrier by a channel coefficient of said sub-carrier and adding a noise contribution of said sub-carrier.

16. The computer program according to claim 14, wherein said selected group of sub-carriers comprises sub-carriers having at least similar channel coefficients in a frequency domain.

17. The computer program according to claim 14, wherein said parameter corresponds to a received noise strength, and said estimation comprises determining a quadratic mean of the combined received signal components for every sub-carrier.

18. The computer program according to claim 14, wherein said parameter corresponds to a received signal strength indicator, and said estimation comprises multiplying the combined received signal components.

19. An apparatus, comprising:
means for determining received signal components for a selected group of sub-carriers based on individual noise and signal contributions of said sub-carriers; and
means for estimating at least one of noise and a parameter relating to at least one of noise and a signal of a received signal by combining said determined received signal components depending on a sign of preamble symbols of said sub-carriers.

20. The apparatus according to claim 19, wherein said determining means determines a received signal component of a sub-carrier by multiplying a signal contribution of said sub-carrier by a channel coefficient of said sub-carrier and adding a noise contribution of said sub-carrier.

\* \* \* \* \*